(12) United States Patent
Dowel

(10) Patent No.: US 8,205,645 B2
(45) Date of Patent: Jun. 26, 2012

(54) SEALING APPARATUS

(75) Inventor: Terence Dowel, Ferntree Gully (AU)

(73) Assignee: Trydel Research Pty. Ltd. (AU)

( * ) Notice: Subject to any disclaimer, the term of this patent is extended or adjusted under 35 U.S.C. 154(b) by 1140 days.

(21) Appl. No.: 12/066,635

(22) PCT Filed: Sep. 13, 2006

(86) PCT No.: PCT/AU2006/001365
§ 371 (c)(1),
(2), (4) Date: Mar. 12, 2008

(87) PCT Pub. No.: WO2007/030896
PCT Pub. Date: Mar. 22, 2007

(65) Prior Publication Data
US 2008/0264540 A1  Oct. 30, 2008

(30) Foreign Application Priority Data
Sep. 13, 2005 (AU) ................. 2005905041

(51) Int. Cl.
*B60C 23/00* (2006.01)
(52) U.S. Cl. .......................... 141/38; 152/415
(58) Field of Classification Search ............ 141/38, 141/67, 98, 100, 102, 105, 329, 330; 152/415, 152/509; 137/625, 597; 251/12
See application file for complete search history.

(56) References Cited

U.S. PATENT DOCUMENTS

| | | | | |
|---|---|---|---|---|
| 3,908,871 A * | 9/1975 | Gottwald | .................. | 222/400.7 |
| 4,308,766 A | 1/1982 | Myers, Jr. | | |
| 6,176,285 B1 * | 1/2001 | Gerresheim et al. | .......... | 152/509 |
| 6,454,892 B1 * | 9/2002 | Gerresheim et al. | .......... | 156/115 |
| 6,889,723 B2 * | 5/2005 | Gerresheim et al. | ............ | 141/38 |
| 7,028,720 B2 * | 4/2006 | Eckhardt | ......................... | 141/38 |
| 7,178,564 B2 * | 2/2007 | Kojima et al. | .................. | 141/38 |
| 7,854,242 B2 * | 12/2010 | Stehle | ............................. | 141/38 |
| 2004/0000365 A1 | 1/2004 | Eckhardt | | |
| 2008/0060734 A1 * | 3/2008 | Stehle | ......................... | 152/416 |

FOREIGN PATENT DOCUMENTS

EP  0 867 494  9/1998

(Continued)

OTHER PUBLICATIONS

Australian Patent Office, International Search Report, Nov. 21, 2006.

(Continued)

*Primary Examiner* — Timothy L Maust
*Assistant Examiner* — Timothy Kelly
(74) *Attorney, Agent, or Firm* — Vedder Price P.C.

(57) ABSTRACT

An apparatus is provided for sealing of a damaged inflatable article, the apparatus including a container (1) for a sealant compound or composition, the container including at least one inlet means (4) which is releasably attachable to a source of pressurized air/gas, an extraction assembly (10 associated with the container (1), the extraction assembly (10 including an extraction unit having at least one outlet means (18) to be releasably coupled with or connected to the article and means (30) to be disposed within the container (1) and actuatable, upon supply of pressurized air/fluid/gas to the container (1) to allow for controlled dispensing of the sealant compound or composition from the container (1) via the extraction unit (10) to the article to be sealed.

17 Claims, 4 Drawing Sheets

FOREIGN PATENT DOCUMENTS

WO            03/041949          5/2003

OTHER PUBLICATIONS

Intellectual Property Office of New Zealand, "Examination Report" for Application No. 567236, Oct. 2, 2009, 2 pp.

Patent Office of the Russian Federation, "Official Action" for Application No. 2008111881/12(012841), May 26, 2009, 5 pp.

Official Action issued by Singapore Patent Office on Feb.13, 2009, enclosing Australian Patent Office Written Opinion for Appl. No. SG 200801976-2, Jan. 22, 2009, 6 pp.

\* cited by examiner

SEALING APPARATUS

FIELD OF INVENTION

The present invention relates, in general terms, to a method and apparatus for the sealing, or more correctly re-sealing after damage, of an inflatable article. More particularly, but not exclusively, the invention relates to a method and apparatus for use in the sealing of an inflatable tyre, of the type employed in any form of vehicle, as for example an automobile, truck, lorry, van or the like, as well as in motor-cycles, bicycles, etc. Whilst throughout the ensuing description reference will be made to a particular and preferred context of usage of the method and apparatus in accordance with the present invention, namely for the sealing or re-sealing of a punctured or otherwise damaged inflatable tyre for a wheeled vehicle, it must be understood that the invention is not to be considered to be limited to that preferred context of usage. Indeed the method and apparatus in accordance with the present invention could be employed to allow for sealing or re-sealing of any form of inflatable article, regardless of its intended context of usage.

THE PRIOR ART

For any wheeled vehicle or means for travel, there always exists the possibility of damage being sustained by any one or more of the inflatable tyres or the like associated therewith. Such damage can be in the form of the sustaining of a puncture, which allows for gradual if not instantaneous deflation of the relevant tyre, thereby preventing, or at least inhibiting, further movement of the vehicle.

In the past there have been employed a number of methods and means for sealing a leak in a damaged inflatable article, such as a vehicle tyre. In one known method a special sealant mixture or compound can be introduced into a deflated or damaged tyre, as for example via a conventional tyre valve associated therewith, such sealant compound functioning to seal any puncture (or punctures) in the tyre itself, whereby to allow for such tyre to be subsequently re-inflated to a pressure at which it will be possible to again move the relevant vehicle, as by driving thereof. The use of such sealant compounds has been found to provide a temporary repair for a thus damaged tyre or (tyres), whereby to allow the vehicle to be transported or moved to a location where a more permanent repair, or actual replacement, can be effected.

In accordance with known practices a suitable sealant compound (of any known type), as housed within a suitable container therefor, is dispensed from the container under pressure and then passed into the tyre, via a tyre valve (again of any known type) invariably associated therewith. This may be achieved either with, or without, removal of the valve insert. To bring about such a result means are included to allow for connection of the container to a source of air or other gas under pressure, as for example a compressor or even a gas bottle. The principle of operation is that, by increasing the air pressure within the container, the contents thereof can be dispensed therefrom and injected into the tyre.

The prior art methods and apparatus have all suffered in terms of their inability to avoid or prevent altogether the possibility or risk of back-flow of the sealant compound in the instance of transfer of such compound from its container to the tyre to be re-inflated being interrupted for any reason, especially prior to the container being emptied of all its content. A number of means have been employed in the past in attempts to avoid this possibility of back-flow, one such involving the utilisation of a conical diaphragm or the like intended to prevent passage of sealing compound.

The present invention seeks to address the problems associated with the prior art by providing an apparatus wherein there is substantially no possibility of back-flow occurring, in the instance of the dispensing of sealing compound being interrupted in any way. With such an apparatus the integrity of any means employed for pressurising the container of sealing compound, whereby to allow for egress of such compound therefrom, is maintained at all times.

OBJECTS OF THE INVENTION

It is an object of the invention to provide a sealing apparatus which may be incorporated into or with a container of tyre puncture sealant compound or composition such that the container and its contents are securely packaged for handling and shipment, and yet are readily accessible for use as and where necessary.

It is a further object of the invention to provide an improved apparatus, for use in the repair/re-sealing of a damaged inflatable article, which is operated by gas/air pressure from an external source but which, upon relaxation of such pressure, is substantially proof against unwanted back-flow of residual sealant compound remaining in said container.

In accordance with one aspect of the present invention there is provided an apparatus for the sealing of inflatable articles said apparatus including: a container adapted to contain a sealant compound or composition, said container including at least one inlet means adapted to be releasably attachable to a source of pressurised air/gas; an extraction assembly adapted to be associated with said container, said extraction assembly including an extraction unit including at least one outlet means adapted to be releasably coupled with or connected to said article to be sealed; and means adapted to be disposed within said container and actuatable, upon supply of pressurised air/fluid/gas to said container, to allow for transfer/egress of said sealant compound or composition from said container via said extraction unit to said article to be sealed, wherein said extraction unit is provided with a standing or supporting surface at the end thereof remote from said container, the arrangement being such as to allow the apparatus to be supported in a stable manner on a given surface whereby to allow for sealing of inflatable articles.

In accordance with another aspect of the present invention there is provided an extraction assembly, for use with a container of sealant compound or composition, for the sealing/repair of a damaged inflatable article, said assembly including: an extraction unit which is adapted, in use, to be releasably associated with or connected to a container of said sealant compound or composition, said extraction unit including at least one outlet means which is adapted, in use, to be releasably connected to said inflatable article whereby to allow for flow of said sealant compound or composition from said container, via said extraction unit, into said inflatable article; and means adapted to be disposed within said container, in flow connection with said extraction unit, which is actuatable upon supply of pressurised air/fluid/gas to said container to allow for controlled dispensing of said sealant compound or composition therefrom, said extraction unit being provided with a standing or support surface at one end thereof, being that end which is, in use, remote from said container, the arrangement being such as to allow said extraction assembly to be supported in a stable manner on a given surface whereby to allow for sealing/repair of a damaged inflatable article.

In accordance with a further aspect of the present invention there is provided a flow control assembly for ensuring controlled one-directional flow of a sealant compound or composition from a container thereof, said assembly including: a length of tubing or the like adapted, in use, to be located within said container and in flow connection with an extraction assembly as claimed in the preceding paragraph; a substantially cylindrical cap-like member to be mounted on the free end of said tubing or the like, said cap-like member including a base having a peripheral skirt extending therefrom and further including a spigot disposed substantially centrally of said base and depending downwardly and substantially normally thereof, and a sealing means associated with said spigot, wherein said base includes apertures extending therethrough to allow for directional flow of said sealant compound or composition.

With regard to the apparatus the at least one inlet means, in the form of a tyre valve or the equivalent, in an especially preferred embodiment such is adapted to be appropriately disposed in a recess sited at or in the vicinity of a shoulder of the container, and remote from the extraction assembly, with the container itself being in the form of a bottle. It should be realised, however, that such at least one inlet means could, in alternative embodiments, be located at other places on the container or bottle, remote from the extraction assembly. By way of example only, such at least one inlet means may be located in the base of the container, with the base of such container not being substantially flat, but rather being recessed in such a way as to include a plurality of supporting legs.

The extraction assembly is adapted to be releasably attachable to the container, as for example by interaction between mating threaded sections.

The at least one outlet means provided in the extraction assembly is preferably in the form of a duct adapted to protrude laterally of the extraction assembly itself to at least some extent, said duct preferably having, at or in the vicinity of the outer free end thereof, means allowing for ready connection with or to further ducting or tubing, to allow for passage of sealant compound to said article to be sealed. In an especially preferred embodiment one or more barbs or the like projections may be formed on the outer periphery of the outlet duct, at or in the vicinity of the outer free end thereof, whereby to facilitate connection with a length of tubing or ducting. Alternatively, both the outlet duct and the tube or ducting can have threaded means adapted to be associated therewith.

Preferably the apparatus further includes a sealing means which is adapted, in use, to be associated with said extraction assembly, with or without the interposition of one or more lengths of tubing. The sealing assembly includes, preferably, a cap or the like member including a base and a downwardly dependent spigot adapted to receive or releasably retain a separate sealing means, as for example an O-ring, together with one or more apertures extending therethrough whereby to allow for selective flow of sealant compound into the extraction assembly.

DESCRIPTION OF THE DRAWINGS

In order that the invention may be more clearly understood and put into practical effect, reference will now be made to preferred embodiments of an apparatus in accordance with the invention. The ensuing description is given by way of non-limitative example only and is with reference to the accompanying drawings, wherein.

DESCRIPTION OF PREFERRED EMBODIMENTS

Figures 1, 2:
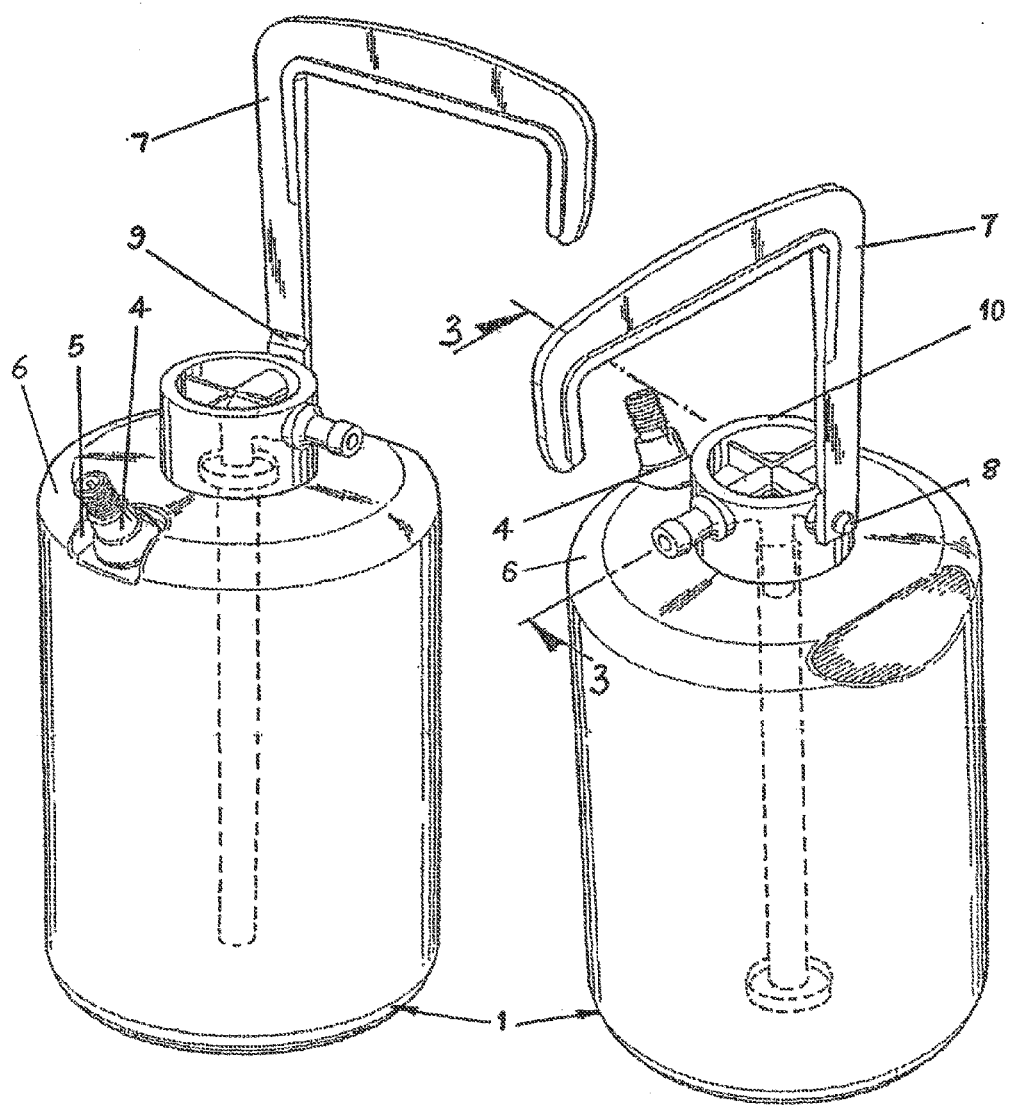
FIG. 1 is a perspective view of an apparatus in accordance with the present invention, disposed in its preferred "use", or inverted, configuration.
FIG. 2 is a further perspective view similar to FIG. 1.

There are shown embodiments of an apparatus in accordance with the present invention which functions as a repair kit or set which can be carried, or in some way housed, within a vehicle for ready use in the instance of damage—as by a puncture—being sustained by a tyre of that vehicle. The apparatus includes, as principal components, a pressure-tight container 1 for housing a suitable sealant compound, such container being adapted in use to be releasably connectable to a source of pressurised air or gas, an extraction assembly adapted to be associated with the container 1, and means allowing for controlled dispensing of sealant compound from the container into a damaged tyre as and when necessary. Preferably, although not necessarily, the container 1 is such that, for use, it is disposed in its inverted position, as shown in FIGS. 1 and 2 for example, with the extraction assembly acting as a platform means or stand therefor.

With reference now to the drawings, the container 1 is preferably in the form of a bottle constructed from a suitable material, as for example a plastics material (preferably a recyclable plastics material). The container 1 has a substantially cylindrical neck 2 which, in the preferred embodiments illustrated, is provided with an external threaded section 3. In the especially preferred embodiments illustrated the container 1 further includes, as an integral part thereof, a valve means 4, preferably disposed within a recess 5 located at or in the vicinity of a shoulder 6 of the overall container 1 and remote from the neck 2. The valve means 4, which preferably is in the form of a "conventional" tyre valve (one-way action), allows for ready connection of the container 1 to a source of pressurised air or suitable gas or fluid, whether such be in the form of a bottle or the like container holding the air/gas or other fluid at an elevated pressure, or alternatively in the form of a compressor or the like (not shown), which may be either installed as part of the overall vehicle or stored separately for use as and when required.

As to the actual contents of the container 1, such does not constitute part of the invention. Any suitable compound having known sealing properties may be utilised. In an especially preferred embodiment, however, the sealing compound will not be latex-based.

The apparatus further includes an extraction assembly, which includes as one component an extraction unit generally designated 10, which is substantially cylindrical in cross-section and of a size and overall shape which is substantially complementary to that of the neck 2 of the container 1. The extraction unit 10 is also preferably formed from a suitable plastics material, as for example by moulding. It should be realised, however, that neither the material of construction nor the method of formation of both the container 1 and the extraction unit 10 constitutes part of the invention.

In the preferred embodiments illustrated the apparatus also includes means which can facilitate transport and/or storage thereof. Such may include a handle 7, constructed preferably of a suitable plastics material, which may preferably be releasably attachable to the extraction unit 10. The handle 7, of a substantial L-shape, may include an aperture at or in the vicinity of the end of one arm thereof, such aperture being adapted, in use, to have disposed therethrough a shaped stud or the like projecting member 8 formed on the outer periphery of the extraction unit 10. The handle 7 further includes a section 9 of reduced thickness at or in the vicinity of the said aperture, such acting as a hinge whereby to allow for folding of the handle 7 to facilitate storage of the overall apparatus when not in use.

The extraction assembly itself, as a first principal component, an extraction unit 10 which includes a first substantially cylindrical section 11 having a series or plurality of internal threads 12 provided therein, such threads 12 being of a size and shape complementary to those provided on the exterior of the neck 2 of the container, to allow for engagement with the threaded section 3 of the neck 2 of the container 1. Preferably the neck 2 of the container 1 and the first section 11 of the extraction unit 10 are of substantially the same length.

Figure 3A:
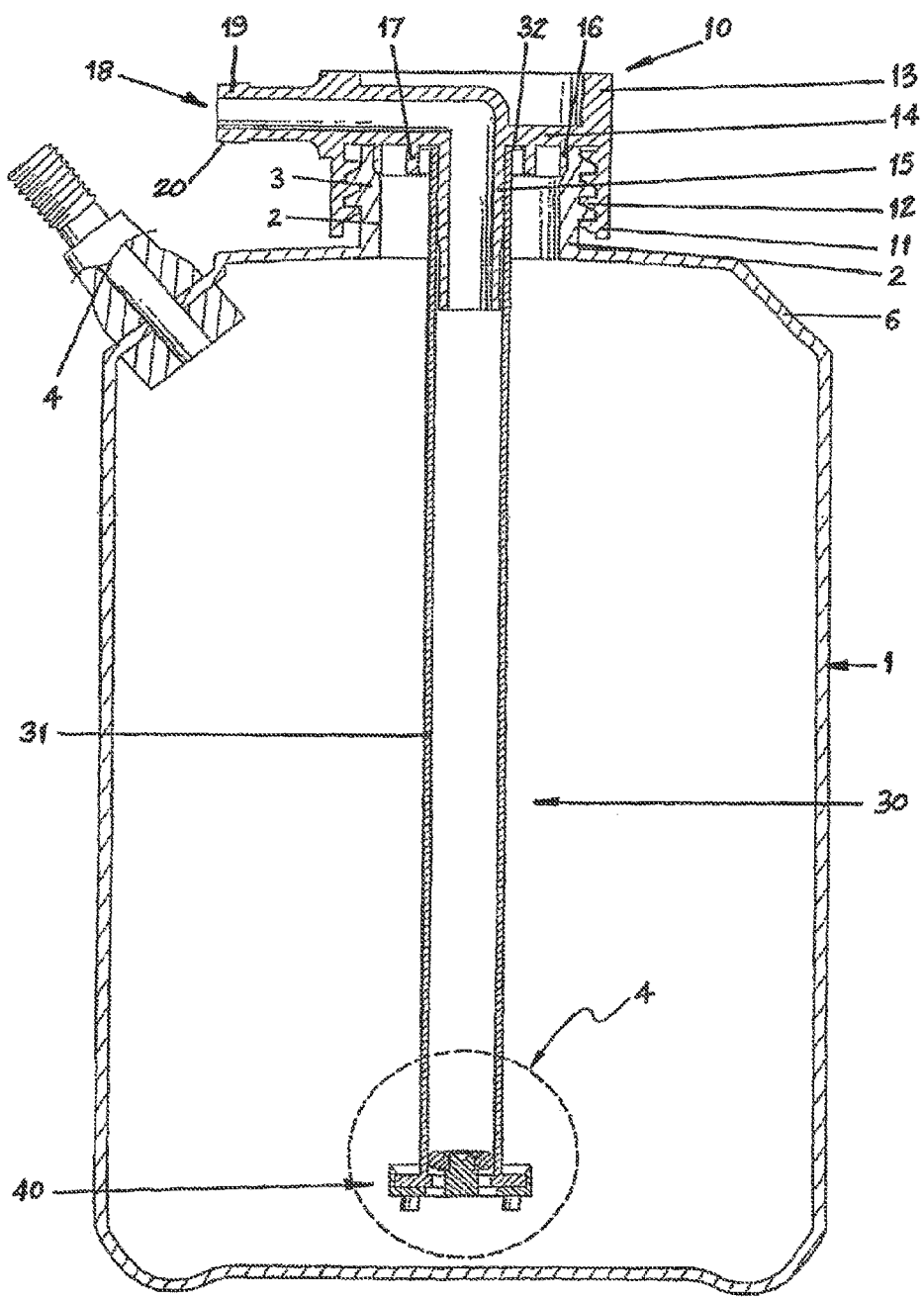
FIG. 3(a) is a sectional view of a first embodiment of an apparatus in accordance with the present invention, taken along the line 3-3 in FIG. 1.
Figure 3B:
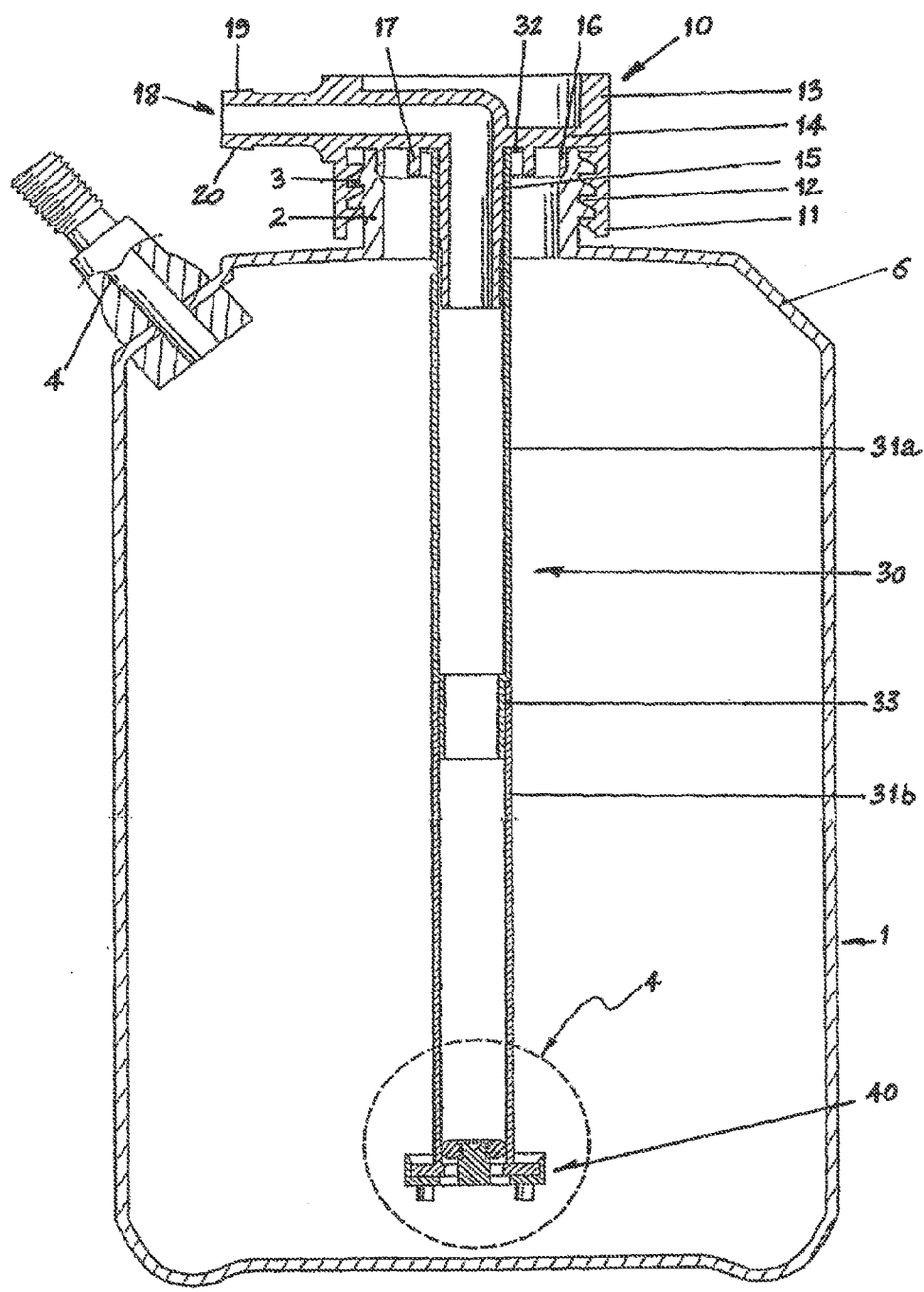
FIG. 3(b) is a view, similar to FIG. 3(a), of a second embodiment of an apparatus in accordance with the present invention.

The extraction unit 10 further includes, at the free end thereof opposite to the first section 11, a second substantially cylindrical section 13 which, in use, provides a support base or pedestal and thereby allows for the overall apparatus to be supported on any given surface, in the configuration or disposition shown in FIGS. 1, 2, 3($a$), 3($b$) and 6. Extending transversely of the extraction unit 10, at or in the vicinity of the junction of sections 11 and 13, is a transverse plate or wall 14 which has, disposed substantially centrally thereof and extending upwardly therefrom in the direction of the first section 11, a substantially hollow tubular duct 15. Preferably the duct 15 will be of a length sufficient to project beyond the uppermost extremity of the first section 11 of the extraction unit 10 and therefore into the main body of the container 1. The plate or wad 14 further includes a plurality of circumferential, spaced-apart beads or the like 16 and 17, with bead 16 functioning to facilitate location of the extraction unit 10 relative to threaded neck 2 of the container 1 as shown, for example, in FIGS. 3($a$) and 3($b$).

In the preferred embodiments illustrated the duct 15 extends downwardly into a hollowed-out lower section of the extraction unit 10, merging into an outlet duct 18 which, in a manner to be explained later, allows for passage of sealant compound from the container 1 to the article to be sealed, as and when desired. Preferably the outlet duct 18 will have, at its outermost free end which projects outwardly from the extraction unit 10 as shown, means allowing for connection to a length of hose or tubing (not shown) via which the overall apparatus (container 1 and associated extraction assembly) can be connected as and when required to an article to be sealed. Preferably the free end of the outlet duct 18 is provided with a portion 19 of greater or enlarged outside diameter, with one or more barbs or the like elements 20 being formed on and extending at least partially around the external surface thereof, to assist in releasably retaining a length of hose or tubing thereon. In one alternative arrangement the free end of the outlet duct 18 may be threaded, to allow for releasable connection to a complementary configured length of hose or tube, in turn to be connected to the article to be sealed.

To allow for controlled dispensing of sealant compound from the container 1 and also to minimise, if not remove altogether, the possibility of back-flow of sealant compound, the apparatus in accordance with the invention further includes a dip-tube assembly, generally designated 30, which is adapted to be housed or located within the container 1 and to be in flow connection with the duct 15 of the extraction unit 10 of the extraction assembly. In an especially preferred embodiment—see for example FIG. 3($a$)—the dip-tube assembly 30 takes the form of a length of tubing 31 adapted, in use, to have one end thereof disposed over the duct 15, and to extend along substantially the height dimension of the container 1 itself, with that end of the tubing 31 including a peripheral flange 32 of a dimension such that, as shown in the drawings, when the tubing 31 is in place the outer periphery thereof is in contact with the surface of the plate 14 and the circumferential bead 17 thereof. In the alternative embodiment of FIG. 3($b$) the dip-tube assembly 30 is in the form of two separate juxtaposed lengths of tubing 31($a$) and 31($b$), with tubing 31($a$) being disposed over the duct 15 of the extraction unit 10, and the second length of tubing 31($b$) being disposed, in a pressure-type fit, over the free end of said first length of tubing 31($a$). To that end, and as shown in FIG. 3($b$), in the vicinity of the free end of the first length of tubing 31($a$) there is provided a section 33 of a reduced external diameter. In each instance, at the free end of the tubing 31, as shown in FIG. 3($a$), or tubing 31($a$), as shown in FIG. 3($b$), there is provided a sealing assembly, generally designated 40. In a further alternative embodiment, not shown, the sealing assembly 40 may be disposed directly on and over the free end of the duct 15, without interposition of any tubing.

Figure 4:
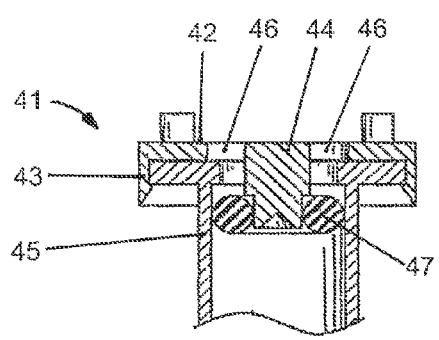
FIG. 4 is a sectioned view of a means employed in accordance with the invention to prevent, or substantially eliminate the possibility of, back-flow of sealant compound.
Figure 5:
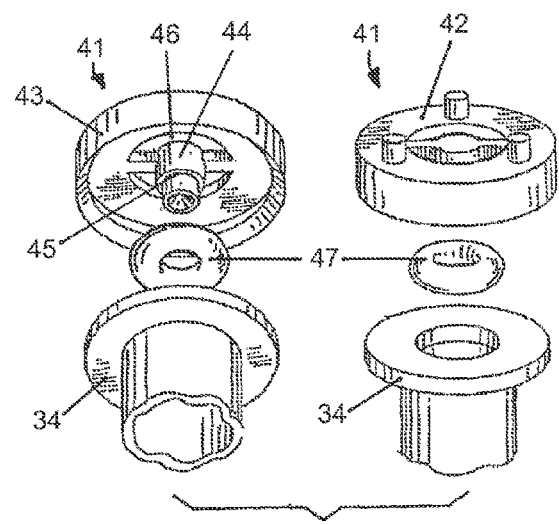
FIG. 5 (from left to right) shows respective bottom and top perspective and exploded views of the arrangement of FIG. 4.

As to the sealing assembly 40, such takes the form of a cap member 41 which is adapted to be releasably associated with or attachable to a peripheral flange 34 provided at the free end of the tubing 31, 31($b$). In the especially preferred embodiment illustrated the cap 41 takes the form of a substantially cylindrical member having a substantially flat base 42 and a peripheral skirt 43 depending downwardly therefrom. The base 42 includes, disposed substantially centrally thereof, a downwardly directed spigot 44, which is substantially cylindrical in shape but with adjacent or contiguous sections of different external diameter, with a shoulder 45 formed therebetween. The base 42 further includes one or more apertures 46, preferably disposed symmetrically relative to the downwardly depending spigot 44. The sealing assembly 40 preferably further includes an O-ring seal 47 or the like sealing member, of any suitable material as for example rubber, which is adapted in use to be disposed within the sealing assembly 40, to "sit" against the shoulder 45, as shown in FIG. 4.

Figure 6:
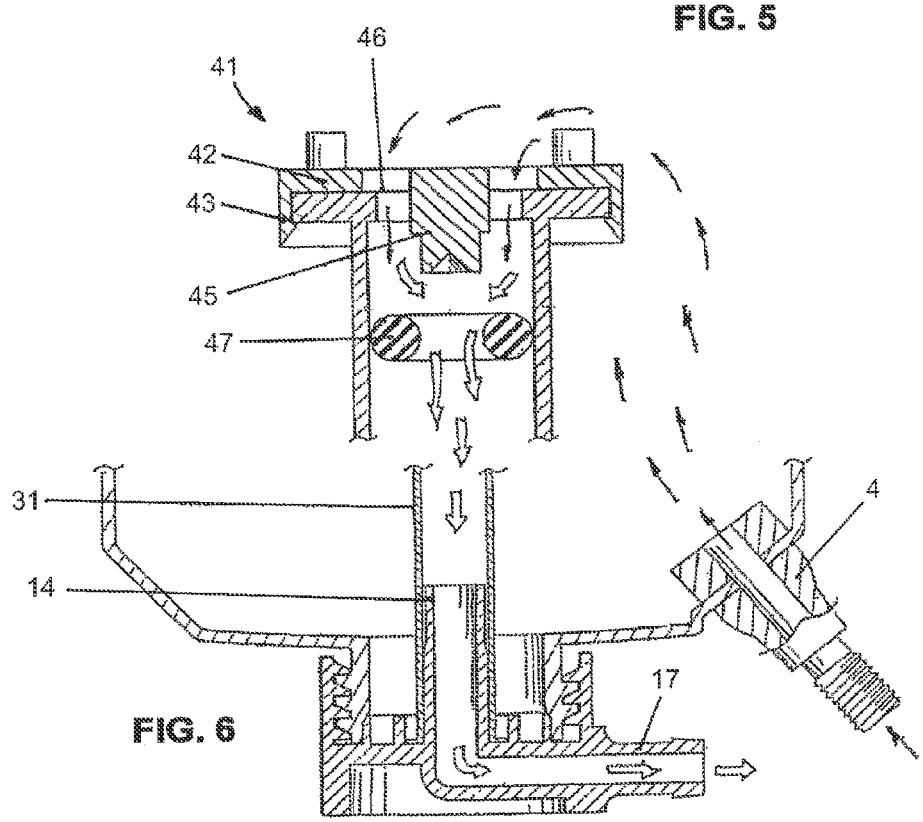
FIG. 6 is an exploded view of an apparatus in accordance with the present invention, illustrating the principle of operation thereof.

The principle of operation of the overall apparatus will now be explained in more detail, with particular reference to FIG. 6.

When it is desired to re-seal a punctured tyre the container 1 (with sealant compound resident therein) is first connected to a source of pressurized air/gas/fluid, via the valve 4 and appropriate tubing. Further tubing is then connected to the outlet duct 18 of the extraction unit 10, and from there to the tyre itself. When air or other gas, under pressure, is injected into the container 1, as represented diagrammatically by the full arrows (→) in FIG. 6, the internal pressure increases within the container 1 and acts to force the O-ring seal 47 to slide off the spigot 44, away from the shoulder 45 and along the tube 31, 31($a$), thereby allowing the sealant compound, as represented diagrammatically by the open arrows, to flow from the container 1, through the apertures 46 provided in the base 42 of cap member 41, into the dip-tube 31, 31(*a*), along the dip-tube length and then through duct 15 into outlet duct 18 of the extractor unit 10, for subsequent injection into the tyre itself.

The sealing mechanism may, in practice, be placed on the end of the dip-tube 31 or, in an alternative arrangement, may be located directly into the first section 11 of the extraction unit. This will mean that the container may be capable of being emptied even in the inverted position.

The present applicant's arrangement allows for the container 1 to be used, in an inverted or upright position, and yet still be emptied. Further, the present arrangement functions to substantially remove the risk of back-flow of sealant compound into the source of pressurised air or other gas. If transfer of sealant compound is interrupted before the container is emptied, the dip-tube with associated sealing means acts to prevent back-flow, in that once the pressure within the container reduces, then the O-ring seal will move back into position on the shoulder 45 of spigot 44, preventing further egress of sealant compound through the apertures 46 of cap member 41.

In a further preferred embodiment, not shown, the extraction assembly may be in the form of an apparatus of a known type, as shown for example in U.S. Pat. No. 4,308,766, which includes both a tyre valve core remover (and subsequent replacer), as well as an injection means for injecting a liquid tyre sealant composition into an inflatable tyre.

Finally, it is to be understood that the foregoing description refers merely to preferred embodiments of the invention, and that variations and modifications will be possible thereto without departing from the spirit and scope of the invention, the ambit of which is to be determined from the following claims.

The invention claimed is:

1. An apparatus for the sealing of inflatable articles, said apparatus including: a container adapted to contain a sealant compound or composition, said container including at least one inlet means adapted to be releasably attachable to a source of pressurized air or gas; an extraction assembly adapted to be associated with said container, said extraction assembly including an extraction unit including at least one outlet means adapted to be releasably coupled with or connected to said article to be sealed, and a dispensing means adapted to be disposed within said container and actuatable, upon supply of pressurized air or gas to said container, to allow for controlled dispensing of said sealant compound or composition from said container via said extraction unit to said article to be sealed, wherein said extraction unit is provided with a standing or supporting surface at an end thereof remote from said container to allow the apparatus to be supported in a stable manner on a given surface whereby to allow for sealing of inflatable articles, wherein said dispensing means is adapted in use to be disposed within said container and is in the form of a length of tubing having a flow control assembly associated with, a free end of said length of tubing which is remote from said extraction unit, wherein said flow control assembly includes: a substantially cylindrical cap-like member adapted to be mounted on or associated with said free end of said length of tubing, said cap-like member including a base having a peripheral skirt extending therefrom, said base including a spigot disposed substantially centrally thereof, and a sealing means adapted, in use, to be associated with said spigot, and wherein said base includes opposed apertures extending therethrough to allow for directional flow of said sealant compound or composition, and wherein said spigot projection normally of said base of said cap-like member, includes juxtaposed lengths of different diameter, with a shoulder at the line of juncture thereof, and wherein a sealing means, is movable, under pressure, into and out of engagement with said shoulder whereby to control flow of sealant compound into said tubing.

2. The apparatus as claimed in claim 1, wherein the pressure source is an air compressor with which air under pressure can be introduced into the container via said at least one inlet means, wherein said at least one inlet means is a one-way valve associated with said container.

3. The apparatus as claimed in claim 1, wherein said pressure source is at least one container of pressurized air or gas, adapted to be releasably connectable to said container via said at least one inlet means, and wherein said at least one inlet means includes a one-way valve, and wherein said container includes a neck portion extending substantially normally from the top thereof, said neck portion being disposed substantially centrally of said top of said container and having a plurality of external threads extending along at least part of the length dimension thereof.

4. The apparatus as claimed in claim 3, wherein said extraction unit is releasably connectable to said neck portion of said container, and wherein said extraction unit includes a plurality of internal threads extending along at least part of the length dimension thereof, said extraction unit being of a substantially cylindrical shape when viewed in cross-section, said extraction unit being of a unitary construction and including, at a position intermediate the ends thereof, a wall or closure means extending laterally thereof, said wall or closure means dividing said extraction unit into two sections, a first section adapted, in use, to be disposed within said neck portion of said container, and a second section adapted, in use, to extend or project from the neck portion of said container.

5. The apparatus as claimed in claim 4 wherein said first section includes, disposed substantially centrally thereof and in flow connection with an aperture extending through said wall or closure means, a hollow cylindrical protrusion of a length at least the equivalent of the length of said first section, said protrusion being adapted, in use, to extend into said container, and wherein said second section includes an outlet duct or means, in flow connection with said aperture of said wall or closure means, projecting transversely of said extraction unit, said outlet duct or means including means allowing for releasable connection with tubing or hosing to allow for passage therethrough of the contents of said container.

6. The apparatus as claimed in claim 5, wherein said container is manufactured from a plastics material, and wherein said extraction unit is of a unitary construction and is manufactured from a plastics material.

7. The apparatus as claimed in claim 6, wherein the extraction unit includes an at least substantially cylindrical connection section, with a pedestal section adjoining the end of said connection section, with the side of said pedestal section remote from said container being formed as a standing surface.

8. The apparatus as claimed in claim 7, wherein a filling line is adapted to be connected to said outlet duct or means of said second section of said extraction unit, said filling line being capable of being coupled to a valve of the article to be sealed, and wherein said dispensing means is adapted in use to be in flow connection with said hollow protrusion of said first section of said extraction unit.

9. An extraction assembly, for use with a container of sealant compound or composition, for the sealing/repair of a damaged inflatable article, said assembly including: an extraction unit which is adapted, in use, to be releasably associated with or connected to a container of said sealant compound or composition, said extraction unit including at least one outlet means which is adapted, in use, to be releasably connected to said inflatable article whereby to allow for flow of said sealant compound or composition from said container, via said extraction unit, into said inflatable article; and a dispensing means adapted to be disposed within said container, in flow connection with said extraction unit, which is actuatable upon supply of pressurised air or gas to said container to allow for controlled dispensing of said sealant compound or composition therefrom, said extraction unit being provided with a standing or support surface at one end thereof, being that end which is, in use, remote from said container to allow said extraction assembly to be supported in a stable manner on a given surface whereby to allow for sealing and/or repair of a damaged inflatable article, wherein said dispensing means is adapted in use to be disposed within said container and is in the form of a length of tubing having a flow control assembly associated with a free end of said length of tubing which is remote from said extraction unit, wherein said flow control assembly includes: a substantially cylindrical cap-like member adapted to be mounted on or associated with said free end of said length of tubing, said cap-like member including a base having a peripheral skirt extending therefrom, said base including a spigot disposed substantially centrally thereof, and a sealing means adapted, in use, to be associated with said spigot, and wherein said base includes opposed apertures extending therethrough to allow for directional flow of said sealant compound or composition, and wherein said spigot, projecting normally of said base of said cap-like member, includes juxtaposed lengths of different diameter, with a shoulder at the line of juncture thereof, and wherein a sealing means, preferably in the form of an O-ring, is movable under pressure into and out of engagement with said shoulder, whereby to control flow of sealant compound.

10. The extraction assembly as claimed in claim 9, wherein said container is a bottle which includes a neck portion extending substantially normally from the top thereof, said neck portion being disposed substantially centrally of said top of said container, and wherein said neck portion has a plurality of external threads extending along at least part of the length dimension thereof, and wherein said extraction unit is releasably connectable to said neck portion of said container, and wherein said extraction unit includes a plurality of internal threads extending along at least part of the length dimension thereof, said extraction unit being of a substantially cylindrical shape when viewed in cross-section.

11. The extraction assembly as claimed in claim 10, wherein said extraction unit is of a unitary construction and includes, at a position intermediate the ends thereof, a wall or closure means extending laterally thereof, said wall or closure means dividing said extraction unit into two sections, a first section adapted, in use, to be disposed within said neck portion of said container, and a second section adapted, in use, to extend or project from the neck portion of said container.

12. The extraction assembly as claimed in claim 11 wherein said first section includes, disposed substantially centrally thereof and in flow connection with said aperture extending through said wall or closure means, a hollow cylindrical protrusion of a length at least the equivalent of the length of said first section, said protrusion being adapted, in use, to extend into said container, and wherein said second section includes an outlet duct or means, in flow connection with said aperture of said wall or closure means, projecting transversely of said extraction unit, said outlet duct or means including means allowing for releasable connection with tubing or hosing to allow for passage therethrough of the contents of said container, and wherein the extraction unit includes an at least substantially cylindrical connection section, with a pedestal section adjoining the end of said connection section, with the side of said pedestal section remote from said container being formed as a standing surface.

13. The extraction assembly as claimed in claim 12, wherein a filling line is adapted to be connected to said outlet duct or means of said second section of said extraction unit, said filling line being capable of being coupled to a valve of the article to be sealed.

14. The extraction assembly as claimed in claim 9, wherein said dispensing means is adapted to be in flow connection with said hollow protrusion of said first section of said extraction unit.

15. The extraction assembly as claimed in claim 9, wherein said container includes at least one outlet means which is adapted to be releasably attached to a source of pressurized air or gas, and wherein the source of the pressurized air or gas is in an air compressor with which air under pressure can be introduced into the container via said at least one inlet means, wherein said at least one inlet means is a one-way valve associated with said container.

16. The extraction assembly as claimed in claim 9, wherein said pressure source is at least one bottle of pressurized air/gas, adapted to be releasably connectable to said container via said at least one inlet means, and wherein said at least one inlet means includes a one-way valve.

17. A flow control assembly for ensuring controlled one-directional flow of a sealant compound or composition from a container thereof, said assembly including:
a length of tubing adapted, in use, to be located within said container and in flow connection with an extraction assembly as claimed in claim 9; a substantially cylindrical cap-like member to be mounted on a free end of said tubing, said cap-like member including a base having a peripheral skirt extending therefrom and further including a spigot disposed substantially centrally of said base and depending downwardly and substantially normally thereof, and a sealing means associated with said spigot, wherein said base includes apertures extending therethrough to allow for directional flow of said sealant compound or composition.

* * * * *